United States Patent
Kobayashi et al.

(10) Patent No.: US 6,253,578 B1
(45) Date of Patent: Jul. 3, 2001

(54) GLASS MELTING PROCESS AND APPARATUS WITH REDUCED EMISSIONS AND REFRACTORY CORROSION

(75) Inventors: Hisashi Kobayashi, Putnam Valley; Kuang-Tsai Wu, Yorktown, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 688 days.

(21) Appl. No.: 08/631,591

(22) Filed: Apr. 12, 1996

(51) Int. Cl.$^7$ .......................... C03B 5/225; C03B 5/435
(52) U.S. Cl. .............. 65/134.4; 65/135.1; 65/335; 65/346; 65/347
(58) Field of Search .................. 65/134.1, 134.4, 65/135.1, 335, 346, 347

(56) References Cited

U.S. PATENT DOCUMENTS

| | | | |
|---|---|---|---|
| 4,029,489 | * | 6/1977 | Froberg et al. .................. 65/136 |
| 4,473,388 | * | 9/1984 | Lauwers ........................... 65/134.4 |
| 4,604,123 | * | 8/1986 | Desprez et al. .................. 65/134.4 |
| 4,986,748 | * | 1/1991 | Brown et al. .................... 431/188 |
| 5,139,558 | * | 8/1992 | Lauwers ........................... 65/134.4 |
| 5,147,438 | * | 9/1992 | Castelain et al. ................ 65/134.4 |
| 5,158,590 | * | 10/1992 | Jouvaud et al. .................. 65/134 |
| 5,199,866 | * | 4/1993 | Joshi et al. ...................... 431/353 |
| 5,256,058 | * | 10/1993 | Slavejkov et al. ................ 431/187 |
| 5,449,286 | * | 9/1995 | Snyder et al. .................... 431/9 |

OTHER PUBLICATIONS

Database CAPLUS, Chemical Abstracts, (Columbus, OH, USA), Jurcik, Benjamin et al., 'Effect of design and operating condition changes on the heat transfer in an oxy–fuel–fired glass–melting furnace,' Sklar Keram. (1995), 45 (8–9), 181–184 (Czech).*

R.G.C. Beerkens and H. Kobayashi, paper presented at the 4th International Conference on Advances in Fusion & Processing of Glass, May 1995, Wurzberg, Germany.

H. Kobayashi, K.T. Wu, R. Richter, paper presented at the 4th International Conference on Advances in Fusion & Processing of Glass, May 1995, Wurzberg, Germany.

* cited by examiner

*Primary Examiner*—Sean Vincent
(74) *Attorney, Agent, or Firm*—Donald T. Black

(57) ABSTRACT

A glassmelting apparatus which reduces alkali corrosion comprising: a glassmelting furnace having a plurality of walls, a crown, a charge end, a batch melting area and a fining area; at least two low momentum oxy-fuel burners located in at least one of the walls of the glassmelting furnace, each burner having at least one gas exit port, the lowest point of each gas exit port of each burner having a vertical position that is raised to a height of about 18 inches to about 36 inches above the surface of the glass; each oxy-fuel burner generating a flame along a path directed towards an opposite vertical wall of the glassmelting furnace; and said interior intersection of said walls and said crown of said glassmelting furnace being located at a height of between about 5.5 feet and 9 feet above the glassmelt surface.

5 Claims, 3 Drawing Sheets

GLASS MELTING PROCESS AND APPARATUS WITH REDUCED EMISSIONS AND REFRACTORY CORROSION

FIELD OF THE INVENTION

This invention relates to a process for glassmelting with oxy-fuel burners and more particularly to the reduction of alkali volatilization and of alkali vapor species near the crown of the furnace.

BACKGROUND OF THE INVENTION

In the making of glass, glassmaking materials are provided into a glassmelting furnace and melted into molten glass which is then poured into molds to produce products such as, for example, glass bottles. The glassmaking materials include batch oxidizers such as salt cake (calcium sulfate, $CaSO_4$) and niter (sodium nitrate, $NaNO_3$, and potassium nitrate, $KNO_3$) in order to control the redox state of the glass.

The glassmaking materials are melted in the furnace by heat provided by the combustion of fuel and oxidant. Water vapor resulting from the combustion reacts with alkali oxides in the molten glass to form alkali hydroxides which vaporize out from the molten glass. These alkali hydroxides, such as sodium hydroxide, NaOH, react with furnace refractory walls and cause refractory corrosion, and, further react in the flue passage after the furnace with sulfur dioxide, $SO_2$, and oxygen to form sodium sulfate, $Na_2SO_4$, and other sulfate and sulfite compounds which form particulates and often require expensive electrostatic precipitators or baghouses to ensure that they are not emitted to the atmosphere.

Accelerated corrosion is experienced in "super structure" refractory bricks in glassmelting furnaces that are converted to oxy-fuel firing. In particular, severe loss of silica crown is observed in some glassmelting furnaces such as in glass melting for TV panels. It is generally believed that the main cause of the accelerated corrosion is the higher concentrations of volatile alkali species, such as sodium hydroxide (NaOH) and potassium hydroxide (KOH), under oxy-fuel firing.

In oxy-fuel firing nitrogen contained in the combustion air is largely removed and the volume of the combustion products is typically reduced to ⅓ to ¼ of that of the conventional air firing. Thus the concentrations of alkali species would increase three to four times as compared to the, same amount of volatile alkali species generated in conventional air firing.

Accelerated corrosion shortens the furnace life and results in costly furnace repairs. In addition, corrosion increases glass defects in some glass tanks due to dripping of slag into the glass bath. Corrosion resistant refractory bricks such as alumina and alumina-zirconia-slica (AZS) bricks have been used to alleviate this corrosion. For example, AZS is often used for side walls and flue port walls, of glass furnaces, to control the corrosion problems. Silica bricks are the most widely used refractory material for the crown of furnaces because it is lighter, less conductive and substantially less expensive than alumina and AZS bricks. Also, there is a concern for increasing glass defects caused by zirconia "refractory stones" when AZS is used for the crown. When silica is used as the material that makes up the crown of the furnace, corrosion, which causes dripping of slag into the glass bath, does not necessarily result in glass defects. This is because silica is the main composition of glass.

In order to reduce volatilization of alkali species from glass and batch surfaces hot spots on the glass and batch surfaces and high gas velocities near the surfaces should be avoided. This is accomplished by using low momentum oxy-fuel flames placed at least 12 inches above the surface of the glass bath. A "low momentum oxy-fuel flame" is defined as a flame formed by reacting a fuel and an oxidant containing at least 30% $O_2$ which has a moementum-averaged velocity less than 200 ft/sec, preferably less than 100 ft/sec, at the exit plane of the gas exit port of the burner, such as, for example, the oxy-fuel burner in U.S. Pat. No.5,449,286, incorporated herein by reference. The flame is directed substantially horizontally to avoid the flame impingement on the batch and glass surfaces.

It would be very desirable to provide a glassmelting method wherein silica bricks can be used to line the crown of the furnace and wherein volatilization of alkali species is reduced to minimize corrosion of the crown.

OBJECTS OF THE INVENTION

It is therefore an object of the invention to provide a glass melting apparatus and process that reduces the rate of corrosion of silica and other refractory bricks of a furnace under oxy-fuel firing to a level that is equal to or less than that of conventional air firing.

SUMMARY OF THE INVENTION

A glassmelting apparatus which reduces alkali corrosion comprising:
  a glassmelting furnace having a plurality of walls, a crown, a charge end, a batch melting area and a fining area;
  at least two low momentum oxy-fuel burners located in at least one of the walls of the glassmelting furnace, each burner having at least one gas exit port, the lowest point of each gas exit port of each burner having a vertical position that is raised to a height of about 18 inches to about 36 inches above the surface of the glass;
  each oxy-fuel burner generating a flame along a path directed towards an opposite vertical wall of the glassmelting furnace; and
  said interior intersection of said walls and said crown of said glassmelting furnace being located at a height of between about 5.5 feet and 9 feet above the glassmelt surface.

BRIEF DESCRIPTION OF THE DRAWING(S)

Other objects, features and advantages will occur to those skilled in the art from the following description of preferred embodiments and the accompanying drawings, in which.

DETAILED DESCRIPTION OF THE INVENTION

This invention may be accomplished by increasing the elevation of the oxy-fuel burners above the glass and batch surfaces, and raising the height of the furnace crown accordingly.

Figure 1:
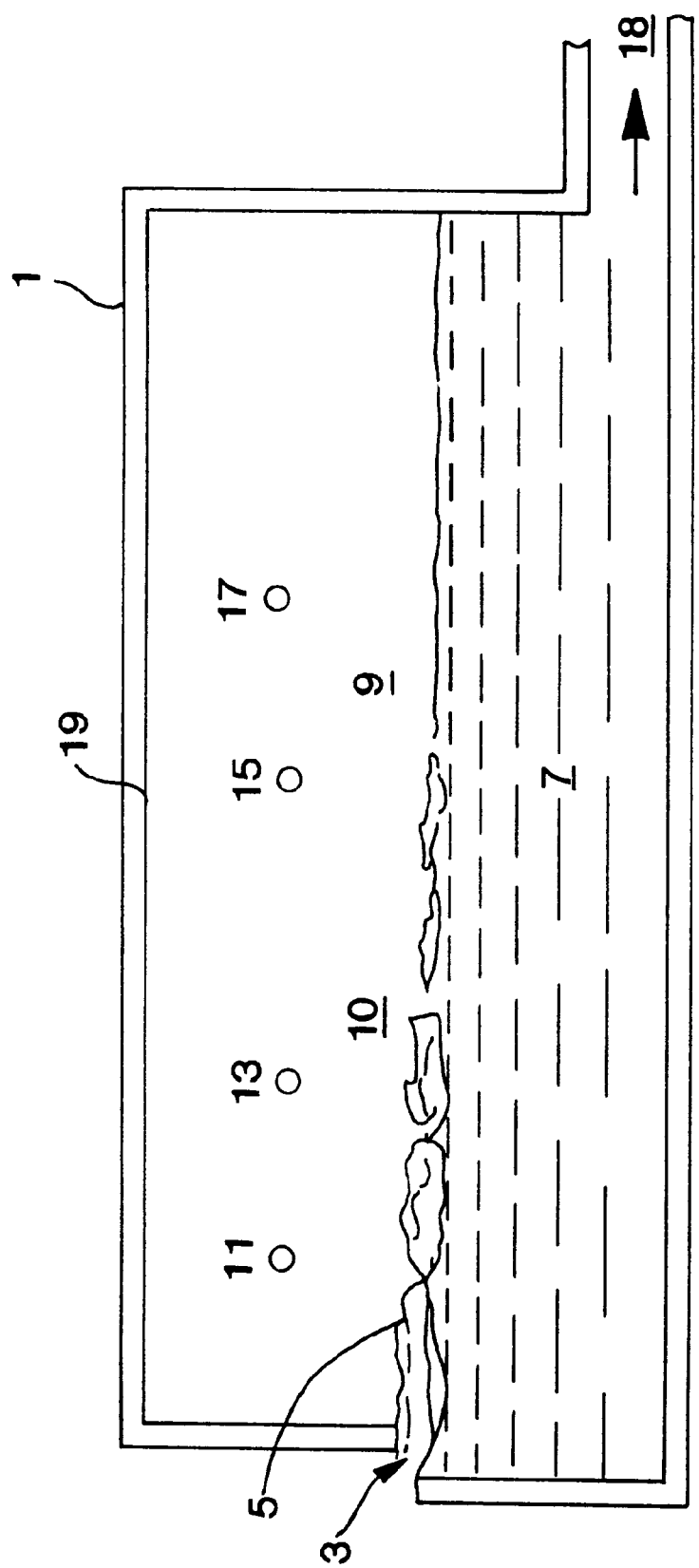
FIG. 1 is a schematic side cross-sectional view of an embodiment of the invention having oxy-fuel burners located above the level of the glass and batch in a glassmelting furnace.

In FIG. 1, there is shown a glassmelting furnace 1, into which glassmaking materials, called the glass batch 5, including alkali species are provided in the charge end 3 of the furnace 1. The glass batch 5 may include one or more of sand, soda ash, limestone, dolomite, salt cake, niter, rouge and cullet or scrap glass. The glass batch 5, upon entering the charge end 3, floats along the surface of the glass, and is melted as it passes through glassmelting furnace 1, to form molten glass 7 within furnace 1.

Fuel and oxidant are provided into furnace 1, through the oxy-fuel burners 11, 13, 15 and 17. The fuel and oxidant may be provided separately into furnace 1, or may be provided together in a premixed condition. Examples of suitable fuels which may be used in the practice of this invention include methane, natural gas, oil and hydrogen. The oxidant may be provided in the form of enriched air having an oxygen concentration which exceeds that of air. Preferably the oxidant is provided in the form of a fluid having an oxygen concentration of at least 30 mole percent, most preferably at least 80 mole percent. The oxidant may, if desired, be provided in the form of commercially pure oxygen.

Alkali hydroxides are formed as a result of water vapor, resulting from the combustion of fuel and oxidant, reacting with alkali oxides in the glassmelt. In order to reduce the rate of alkali transfer to the crown 19 of the glassmelting furnace 1, the alkali (mostly alakli hydroxides such as NaOH and KOH) concentration and/or the gas velocity, near the crown 19, are reduced. The same effect is not accomplished by simply reducing the average alkali concentration measured in the flue gas. The NaOH concentration near the crown of a typical oxy-fuel fired furnace is relatively high. In comparison, for a cross fired air furnace, the NaOH concentration near the crown is much lower than the average concentration of NaOH in the flue gas.

A three dimensional computational furnace model described in a paper by H.Kobayshi, K. T. Wu and W. Richter, entitled "Numerical Modeling of Alkali Volatilization in Glass Furnaces and Applications For Oxy-Fuel Fired Furnace Design", Presented in the 4th International Conference on Advances in Fusion and Processing of Glass, May 1995, predicts lower alkali volatilization by increasing the height of the burner 11, 13, 15 and 17 above the glass 7 and batch surface 5. This reduction is mainly due to the reduced gas velocity near the glass surface when the burner elevation is increased to about 18 to about 36 inches relative to the glass surface.

In the operation of a glass furnace, the firing rates of each burner are adjusted along the longitudinal length of the furnace to provide a desirable longitudinal heat flux distribution, which causes a favorable glassmelt flow pattern for efficient melting of glass batch materials and fining of gas bubbles in glassmelt. A typical crown temperature profile for a container glass furnace has the hottest point ("the hot spot") at about 60% to about 80% of the length of the furnace, measured from the charge end. The charge end is typically the coldest point and may be colder by 100 F. to 200 F. compared to the hottest point. The discharge end is typically colder than the hottest point by about 50 to 100 F.

Alkali corrosion of silica crown is often more aggressive in the charge area, where the combination of relatively high alkali vapor concentration and lower crown temperature promote corrosion. Although the mechanism of corrosion is not fully understood, more favorable formation of sodium silicates at lower temperatures is believed to be the main cause of the problem. It is therefore desirable to maintain the crown temperature higher to reduce the corrosion rate in the charge area of a glassmelting furnace without affecting the longitudinal heat flux distribution.

Figure 5:
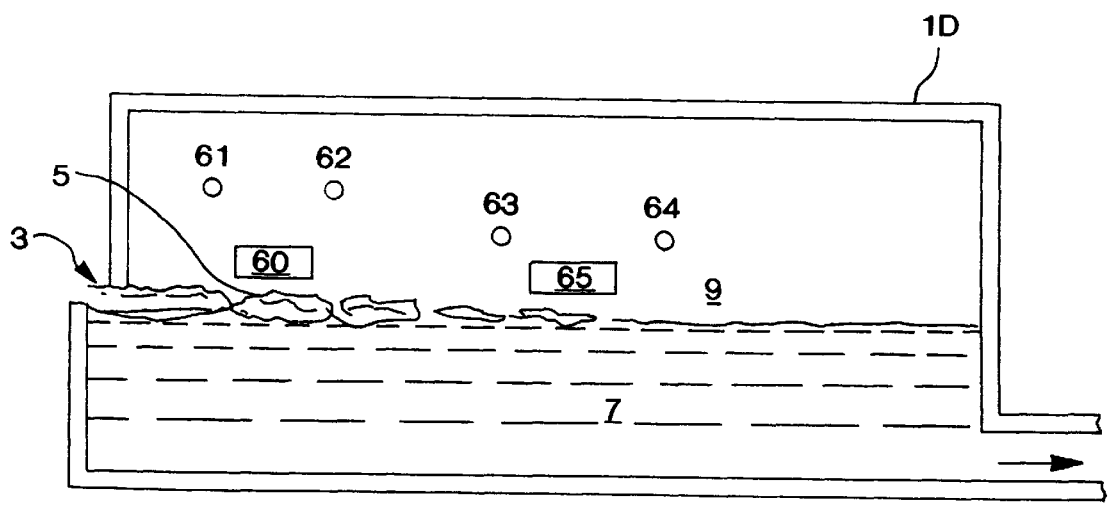
FIG. 5 is a longitudinal view of the glassmelting furnace showing the elevation of the oxy-fuel burners and the flue ports above the glass and batch surface.

In furnace 1D, FIG. 5, burners 61 and 62 in the batch melting area are placed at higher elevation by about 6 inches to about 24 inches than burners 63 and 64 placed in the glass fining area 9. Higher burner elevations for burners 61 and 62 provides two beneficial effects in this arrangement. The crown temperature in the batch melting area 5 is raised due to the higher burner elevation, which is desirable to reduce alkali corrosion of silica bricks. Higher burner elevation also reduces the alkali volatilization rate in the batch melting area due to lower velocity of the gas above the batch surface. In the fining area, the elevation of the burner is kept relatively low since this is the hottest part of the furnace and further increase of the crown temperature in this area could result in exceeding the maximum allowable refractory temperature.

Any higher burner elevation however, increases the temperature at the crown 19. Thus, by increasing the crown height, the burner height can be increased according to the invention without increasing the crown temperature further. In addition, increasing the crown height achieves other beneficial effects, such as lower alkali concentration and lower velocity near the crown. As a result, significant reduction in corrosion rate can be gained.

A higher crown height, however, increases the furnace wall surface area and results in larger wall heat losses. Thus, lower crown height is believed to be preferred from the standpoint of optimizing the furnace energy efficincy. As presented in Example 1 further on, the inventors have discovered a surprising result that higher crown height can enhance the energy efficiency of the glass furnace in spite of the greater wall heat losses. It is preferred to have a side wall height between 5.5 feet to 9 feet. It is most preferred to have a side wall height of 6 feet to 8 feet.

The concentration of alkali vapors in the furnace combustion space 10 are generally higher near the glass surface 9 and batch surface 5 and are believed to be close to the thermodynamic equilibrium values at the surfaces. Typically a boundary layer of high concentration of alkali vapors is formed near the glass and batch surfaces. The thickness of this boundary layer increases in the direction of the gas flow over the surface. To minimize the concentration of alkali species near the crown it is preferable as shown in FIG. 5 to have flue ports 60, 65 below the oxy-fuel burner level near the burners 61–64, or the opposite wall along the path of each burner flame, which would allow exhausting of most of volatiles from glass 7 and batch 5 surfaces before they have a chance to circulate back to the furnace space.

Figure 2:
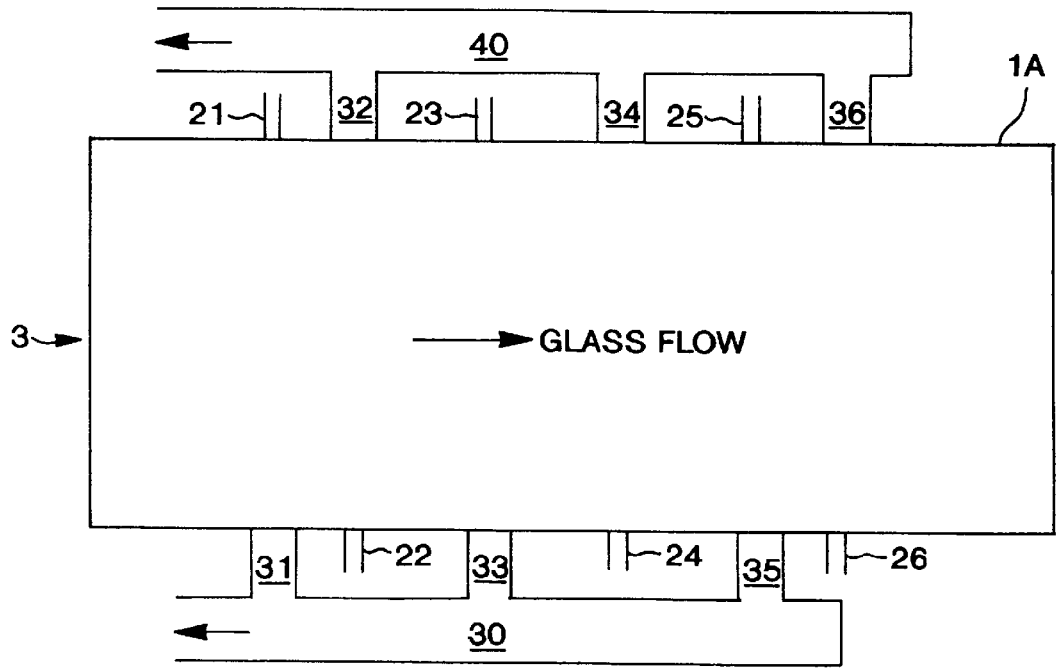
FIG. 2 is a schematic top cross-sectional view of another glassmelting furnace showing the location of the oxy-fuel burners relative to the flue ports.

FIG. 2 depicts a preferred embodiment of the invention which promotes exhausting of volatiles by the arrangement of the flue ports. In this Figure, a glassmelting furnace 1A is fired with six oxy-fuel burners 21, 22, 23, 24, 25, 26 in a staggered arrangement with six flue ports 31, 33, 35 ducted to flue stack 30, and flue ports 32, 34, 36 ducted to flue stack 40.

Figure 3:
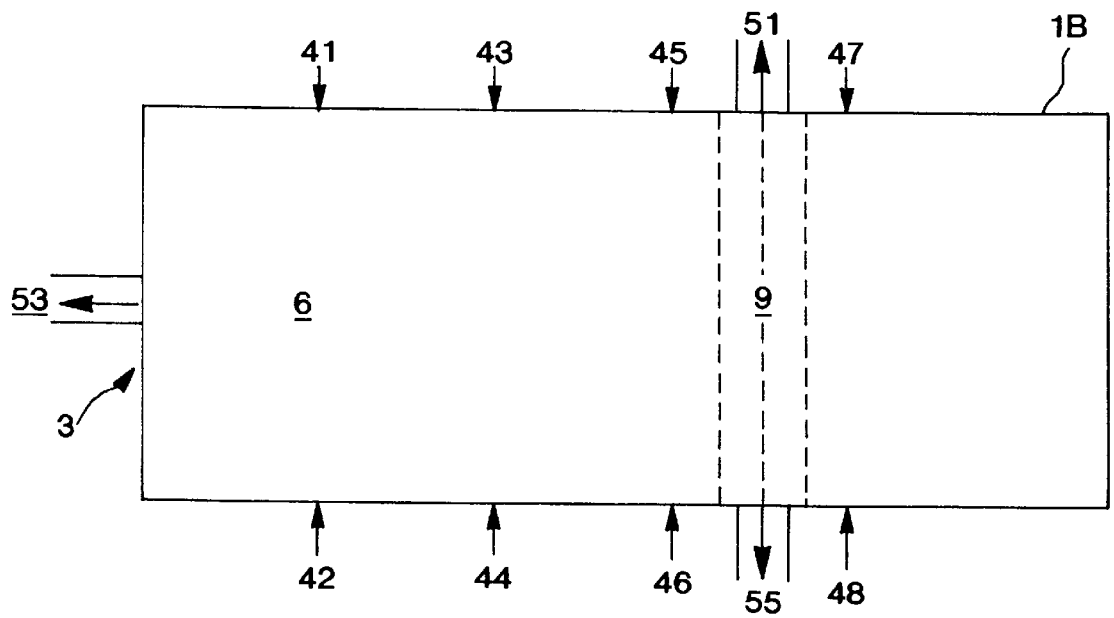
FIGS. 3 and 4 are schematic top cross-sectional views showing additional embodiments of the invention with different arrangements of oxy-fuel burners relative to the placement of flue ports and flue stacks.

Since it may not be cost effective to have many flue ports and duct them together to a flue stack, fewer flue ports may be used near the areas where the generation of volatile alkali species are high. For example, glassmelting furnace 1B in FIG. 3 is fired with eight oxy-fuel burners 41–48 in a directly opposed arrangement with three flue ports 51, 53, 55. One flue port 53 in the back wall 3 and two flue ports 51 and 55, near the hot spot or fining area 9 of the furnace. These longitudinal locations are chosen because the alkali volatilization rates are generally higher over the batch melting area 6 and the fining area 9, having the hottest glass surface temperature.

Figure 4:
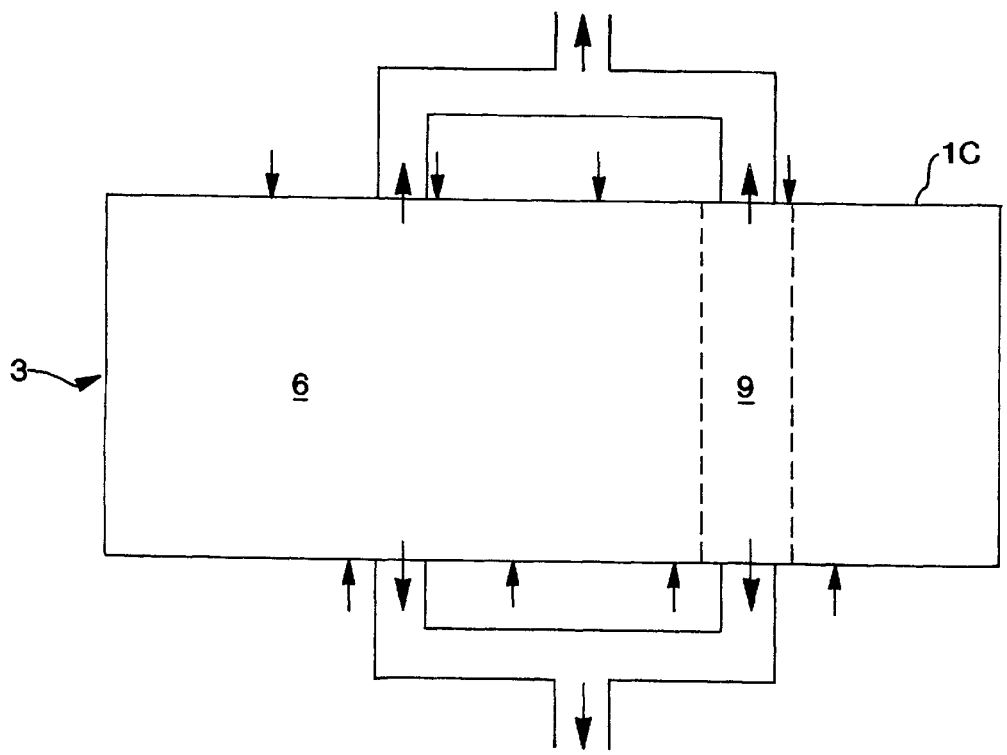

FIG. 4 depicts yet another embodiment of the invention with a different arrangement of the flue ports. Glassmelting furnace 1C is fired with eight oxy-fuel burners in a staggered arrangement and four flue ports in the side walls, two near the back wall 3 and two near the fining area 9 of the furnace.

EXAMPLE 1

This example demonstrates a surprising benefit of high furnace crown height on furnace energy efficiency. Three cases illustrated in Table 1 are results of three dimensional computer model simulation referenced above, of an oxy-fuel fired 380 tons per day container glass melter for two different crown heights and two burner elevations.

TABLE 1

|  | Case A | Case B | Case C |
| --- | --- | --- | --- |
| Glass Production (TPD) | 380 | 380 | 380 |
| Furnace Side Wall Height (ft) | 5.5 | 7.5 | 7.5 |
| Burner Elevation (ft) | (low) 1.1 | (low) 1.1 | (high) 1.9 |
| Fuel Input (MMtBu/hr, LHV) | 43.0 | 43.0 | 43.0 |
| Sensible Heat of Batch gases (MMtBu/hr) | 1.82 | 1.82 | 1.82 |
| Heat Transferred to Glassmelt (MMtBu/hr) | 29.24 | 29.31 | 29.15 |
| Superstructure Wall Losses (MMtBu/hr) | 1.80 | 2.00 | 2.01 |
| Flue Gas Sensible Heat (MMtBu/hr) | 13.78 | 13.51 | 13.66 |
| Flue Gas Temperature (F) | 2784 | 2741 | 2766 |
| Peak Crown Temperature (F) | 2885 | 2867 | 2876 |
| Particulate Emissions (Lb/Hr) |  | 13.53 | 8.02 |

Case A represents a conventional furnace design with oxy-fuel burners, where furnace sidewall height is 5.5 feet and the burner elevation (lowest point of the gas streams injected from the burner) is kept low, i.e. 1.1 ft above the glass surface. A flue port is located on the furnace side wall near the charge end.

Case B shows the simulation of a high crown furnace with 7.5 feet side walls under the same furnace conditions. The peak crown temperature near the fining zone of the furnace is reduced from 2885° F. to 2867° F. by the higher crown. Due to the large wall areas compared to Case A, superstructure wall heat losses increase from 1.80 in Case A to 2.00 MMBtu/hr. A surprising benefit is a reduction of the flue gas temperature from 2784° F. to 2741° F. and the resulting reduction in flue gas sensible heat loss. The net result is that the heat transferred to the glassmelt surface increased from 29.24 to 29.31 MMBru/hr in spite of the higher wall heat losses. When the furnace crown is higher, the radiative heat exchange between the fining area (i.e., the hottest zone) and batch charge area becomes greater. As a result, the crown temperature of the charge area tends to increase. Although higher crown temperature near the flue area is normally associated with higher flue gas temperature, the actual result shows an opposite effect. Although the authors do not wish to be held to a particular theory, this phenomena is believed to be caused by the better gas to batch radiation near the flue area when the crown height is higher.

Case C shows the simulation of a high crown furnace with higher burner elevation of 1.9 ft above the glassmelt surface. All other conditions are the same as those of Case A and B. The peak crown temperature near the fining zone of the furnace in this case is 2876° F. which is higher than that of Case B by 9° F. due to the higher burner elevation, but lower than that of Case A by 9° F., due to the higher crown, in spite of higher burner elevation. Due to the large wall areas compared to Case A, superstructure wall heat losses increase from 1.80 in Case A to 2.01 MMBtu/hr in this Case. A benefit is a reduction of the flue gas temperature from 2784° F. to 2766° F. and the resulting reduction in flue gas sensible heat loss. The net result is that the heat transferred to the glassmelt surface decreased only slightly from 29.24 to 29.31 MMBru/hr in spite of the higher wall heat losses. A large reduction in particulate emissions from 13.53 lb/hr in Case B to 8.02 lb/hr in Case C are the main benefit of this furnace design.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A glassmelting oxygen-fuel burner apparatus which reduces alkali corrosion comprising:

a glassmelting furnace having a plurality of walls, a crown, a charge end, a batch melting area and a fining area;

at least two low momentum oxy-fuel burners located in at least one of the walls of the glassmelting furnace, each burner having at least one gas exit port, the lowest point of each gas exit port of each burner having a vertical position that is raised to a height of about 18 inches to about 36 inches above the surface of the glass;

each oxy-fuel burner generating a flame along a path directed towards an opposite vertical wall of the glassmelting furnace; and said interior intersection of said walls and said crown of said glassmelting furnace being located at a height of between about 5.5 feet and 9 feet above the glassmelting surface.

2. The system of claim 1 further comprising at least one flue port located below the level of the oxy-fuel burners on the same wall of the glassmelting furnace as the oxyfuel-burners.

3. The system of claim 1 further comprising at least one flue port located below the level of the oxy-fuel burner on the opposite glassmelting furnace wall along the path of each burner flame.

4. The system of claim 1 wherein some of said oxy-fuel burners are located in the batch melting area of the glassmelting furnace and are raised to a height of about 18 inches to about 36 inches above the surface of the glassmelt surface.

5. A glassmelting method which reduces alkali corrosion in a glassmelting furnace with oxy-fuel burners comprising:

A) providing glassmaking materials including alkali species into the glassmelting furnace;

B) providing fuel and oxidant into the furnace through the oxy-fuel burners located in a staggered formation in the furnace and having a height of about 18 inches to about 36 inches above the surface of the glass surface;

C) combusting the fuel and oxidant therein to provide heat to the glassmaking materials to form molten glass; and D) minimizing alkali concentration near the crown by positioning of flue ports below the burner level near the burner or the opposite wall along the path of each burner flame.

* * * * *